Aug. 31, 1954 R. R. TREXLER Re. 23,864

LIQUID DISPENSER WITH REGISTER HAVING DISPENSING MEANS OPERATIVE ONLY AFTER TIME INTERVAL ELAPSES FOLLOWING COMPLETED ZERO SETTING OF REGISTER

Original Filed April 3, 1946 5 Sheets-Sheet 1

INVENTOR.
Richard R. Trexler
BY
Moore, Olson and Trexler
Attys.

Aug. 31, 1954 R. R. TREXLER Re. 23,864

LIQUID DISPENSER WITH REGISTER HAVING DISPENSING MEANS OPERATIVE ONLY AFTER TIME INTERVAL ELAPSES FOLLOWING COMPLETED ZERO SETTING OF REGISTER

Original Filed April 3, 1946 5 Sheets-Sheet 2

INVENTOR.
Richard R. Trexler
BY
Moore, Olson & Trexler
Attys.

Aug. 31, 1954 R. R. TREXLER Re. 23,864

LIQUID DISPENSER WITH REGISTER HAVING DISPENSING MEANS OPERATIVE ONLY AFTER TIME INTERVAL ELAPSES FOLLOWING COMPLETED ZERO SETTING OF REGISTER

Original Filed April 3, 1946 5 Sheets-Sheet 3

INVENTOR.
Richard R. Trexler
BY
Moore, Olson & Trexler
Attys.

Aug. 31, 1954 R. R. TREXLER Re. 23,864

LIQUID DISPENSER WITH REGISTER HAVING DISPENSING MEANS OPERATIVE ONLY AFTER TIME INTERVAL ELAPSES FOLLOWING COMPLETED ZERO SETTING OF REGISTER

Original Filed April 3, 1946 5 Sheets-Sheet 4

INVENTOR.

Richard R. Trexler

BY

Moore, Olson & Trexler

Attys.

Aug. 31, 1954 R. R. TREXLER Re. 23,864
LIQUID DISPENSER WITH REGISTER HAVING DISPENSING MEANS OPERATIVE ONLY AFTER TIME INTERVAL ELAPSES FOLLOWING COMPLETED ZERO SETTING OF REGISTER
5 Sheets-Sheet 5
Original Filed April 3, 1946
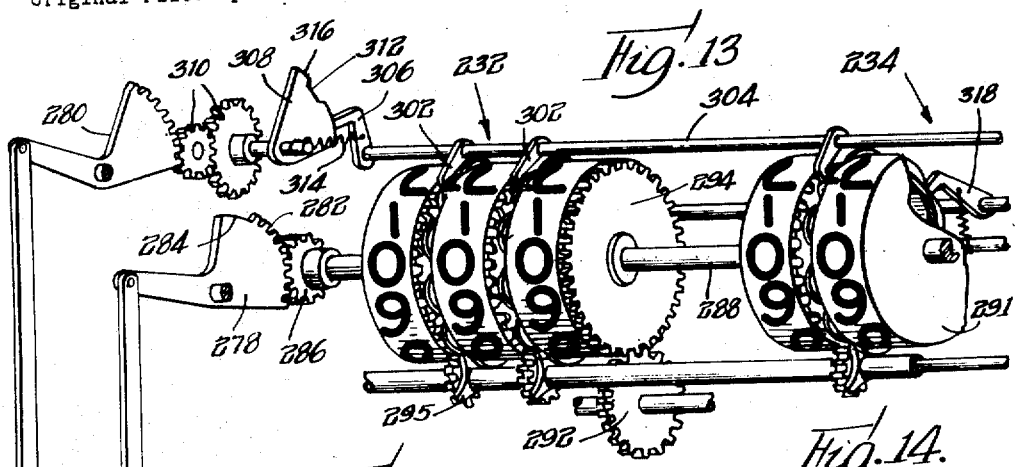
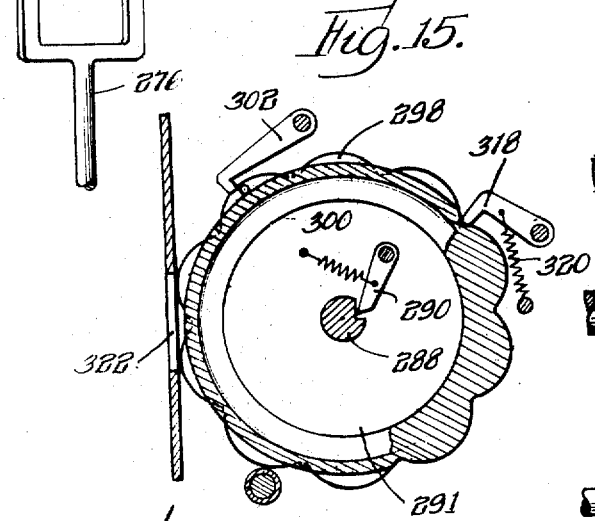
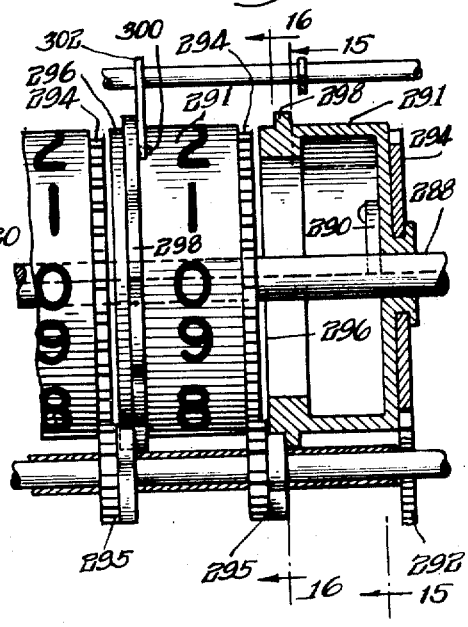
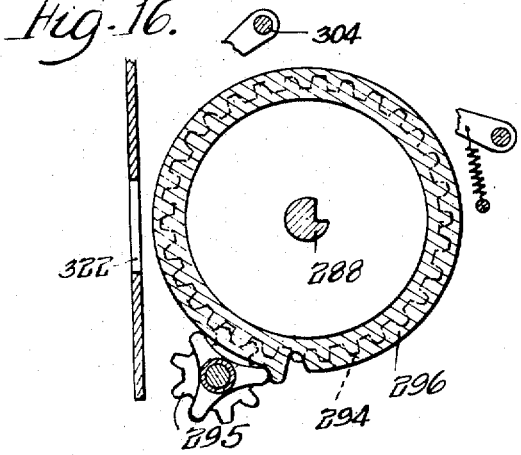
INVENTOR.
Richard R. Trexler
BY
Moore, Olson & Trexler
Attys.

Reissued Aug. 31, 1954

Re. 23,864

UNITED STATES PATENT OFFICE 23,864

LIQUID DISPENSER WITH REGISTER HAVING DISPENSING MEANS OPERATIVE ONLY AFTER TIME INTERVAL ELAPSES FOLLOWING COMPLETED ZERO SETTING OF REGISTER

Richard R. Trexler, Evanston, Ill., assignor to Ballard Moore, Chicago, Ill., as trustee Original No. 2,592,622, dated April 15, 1952, Serial No. 659,299, April 3, 1946. Application for reissue April 20, 1953, Serial No. 349,991

17 Claims. (Cl. 222—33)

Matter enclosed in heavy brackets [ ] appears in the original patent but forms no part of this reissue specification; matter printed in italics indicates the additions made by reissue.

This invention relates to liquid dispensing apparatus, particularly of the type employed for dispensing gasoline and the like for internal combustion engine use.

It is an object of the invention to provide an apparatus of the foregoing type, of improved construction and improved operating characteristics.

More specifically stated, it is an object of the present invention to provide in apparatus of the type set forth, improved means and methods for effecting the resetting of the register mechanism or mechanisms to zero position as an incident to and prior to the beginning of each dispensing operation.

Various more specific objects, advantages and features of the invention will appear from the following specification, when taken in connection with the accompanying drawings, wherein certain preferred embodiments of the invention are set forth for purposes of illustration.

In the drawings, wherein like reference numerals refer to like parts throughout:

Fig. 1 is a general assembly view, with parts broken away for clarity, of a liquid dispensing apparatus constructed in accordance with and embodying the principles of the invention, in accordance with one preferred embodiment there of;

Figure 11:
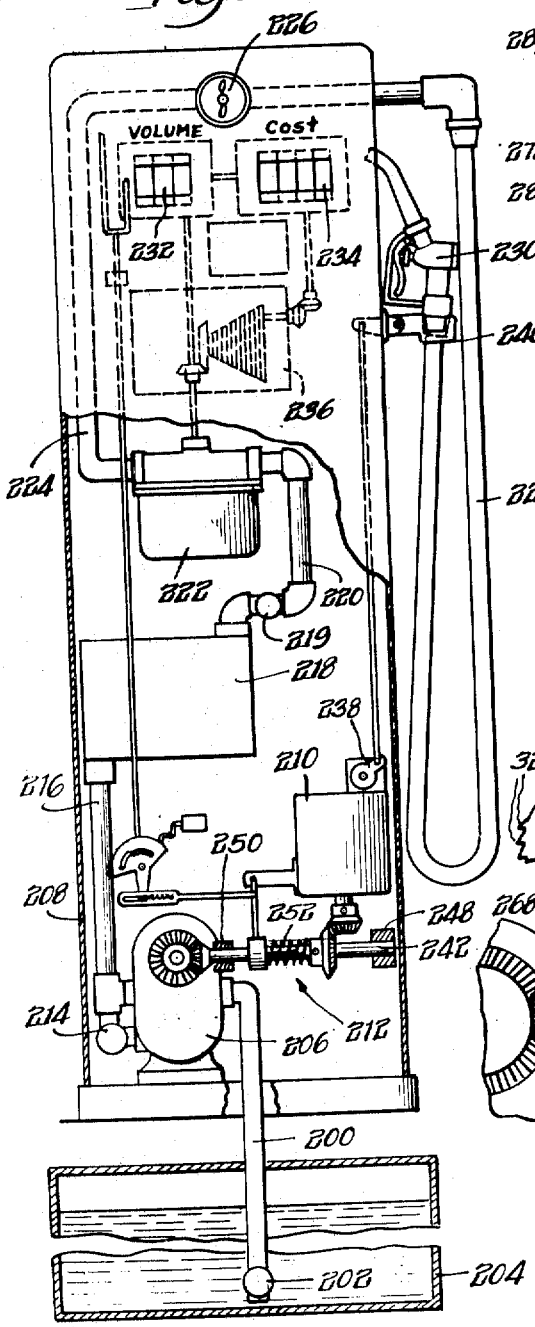
Fig. 11 is a general assembly view of an apparatus constructed in accordance with the principles of the invention, and embodying a mechanical resetting arrangement.
Figure 12:
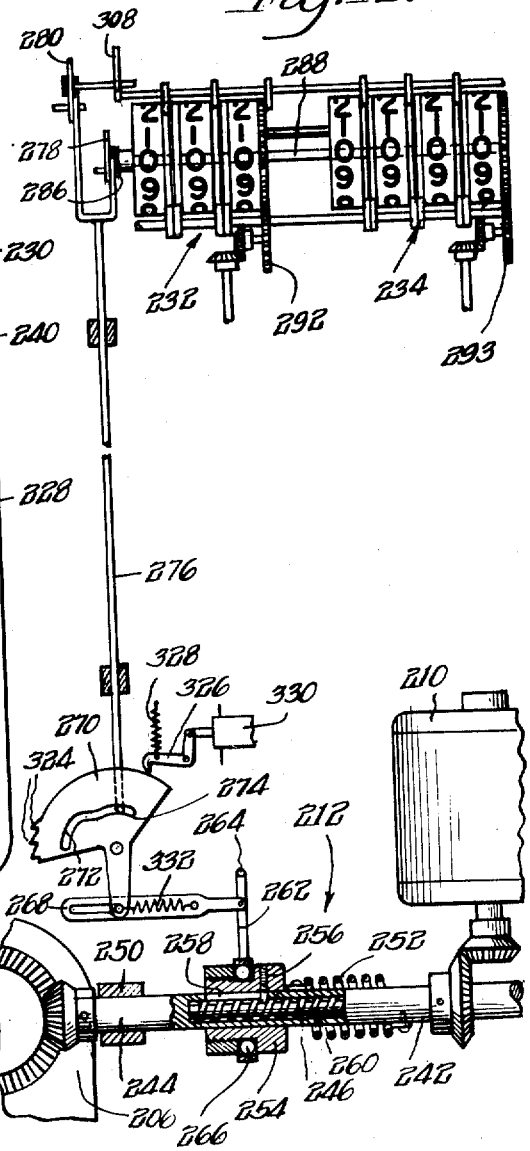

Fig. 12 is a detail illustrative view of the resetting and register parts of the structure of Fig. 11; and Figs. 13–16 are detail views of the register structure of Figs. 11 and 12, Figs. 15 and 16 being taken as indicated by the lines 15—15 and 16—16 respectively of Fig. 14.

In the drawings the invention is shown applied to apparatus of the type employed for dispensing gasoline, to which it has particular application. It is to be understood, however, that various features and principles of the invention may be applied to the resetting of other types of register mechanisms, and in other froms of apparatus, within the scope of the appended claims.

Figure 1:
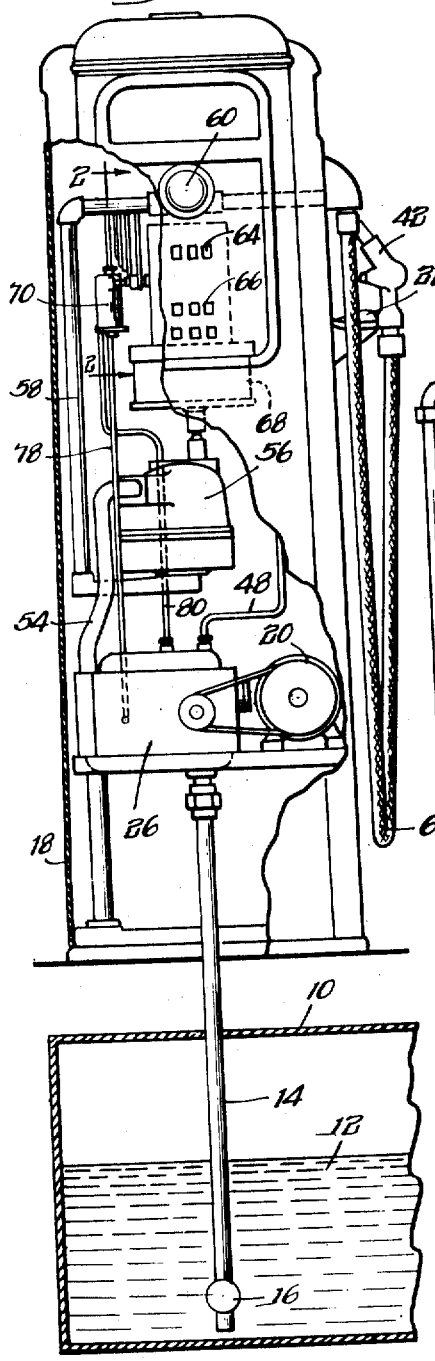

Referring more specifically to the drawings, and first to the structural embodiment illustrated in Figs. 1–5, the structure shown comprises the usual underground storage tank 10, Fig. 1, containing a body of gasoline 12 to be dispensed. A pipe 14 having a foot valve 16 feeds the gasoline from the underground tank to the dispensing apparatus enclosed within the usual housing 18, as shown.

Figure 4:
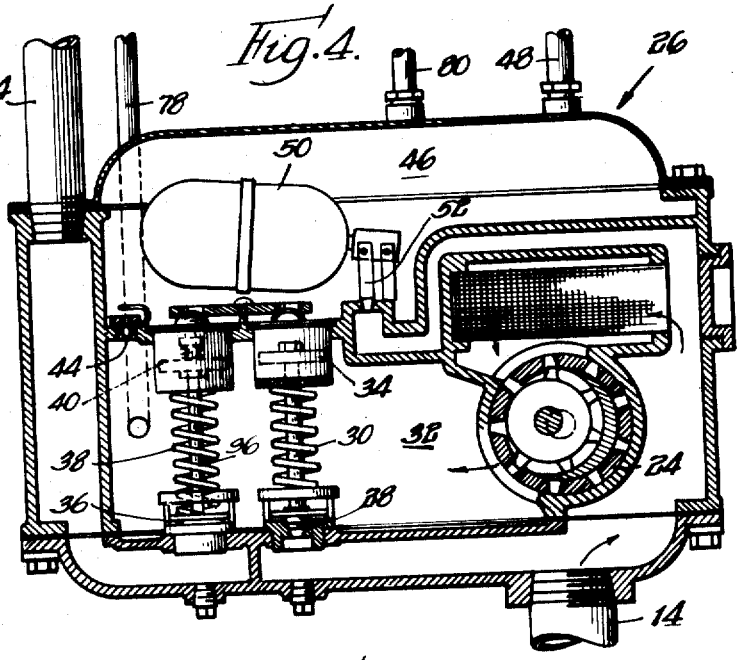
Fig. 4 is a detail view of the air separator mechanism, incorporated as a part of the structure of Fig. 1.

More specifically, the dispensing apparatus comprises a motor 20, the starting switch of which is arranged for actuation by the usual hose hook lever 22. The motor is arranged to drive a pump 24, Fig. 4, forming a part of an air separator structure 26. As best shown in Fig. 4, this air separator structure includes a by-pass valve 28 normally spring-urged into closed position by means of a spring 30, and arranged to open when a predetermined by-pass pressure has been reached in the chamber 32 on the outlet side of the pump, the pressure in this chamber acting upon the opening piston 34 of the valve. The air separator structure further includes a delivery valve 36 normally spring-urged into closed position by means of a compression spring 38, and adapted to be opened by pressure within the chamber 32 acting upon the valve opening piston 40, when a predetermined opening pressure is reached. The delivery valve is set to open at a pressure somewhat lower than the opening pressure of the by-pass valve, so that normally the by-pass valve only opens to relieve excess pressure within the chamber 32, as for example while the pump is running and the nozzle valve associated with the delivery nozzle 42, Fig. 1, is closed. The foregoing parts, except for the structural arrangements of the delivery valve, are similar to those set forth in Foss Patent 2,289,003, dated July 7, 1942, to which reference may be made for a more detailed description of the operation.

The air eliminator structure further includes a constantly open orifice 44 communicating between the pressure chamber 32 and a recovery chamber 46. The recovery chamber has a pipe 48 leading to atmosphere so as to effect the escape of air separated from the gasoline within the air separator structure, and a float 50 controlling a valve 52 which effects the return of liquid to the intake side of the pump which accumulates beyond a predetermined liquid level within the recovery chamber 46.

The delivery valve 36 communicates with an outlet pipe 54, Figs. 1 and 4, leading to a meter 56, the liquid then passing from the meter by means of a pipe 58 through a sight glass 60, and thence to the usual flexible dispensing hose 62 and dispensing nozzle 42 to which reference has previously been made.

The meter is arranged to drive a cost register indicated at 64 in Fig. 1, and a volume register 66, the drive to the cost register being effected through the action of a change speed gearing or cost variator 68 whereby the unit price of the cost calculations may be varied as required.

Figure 2:
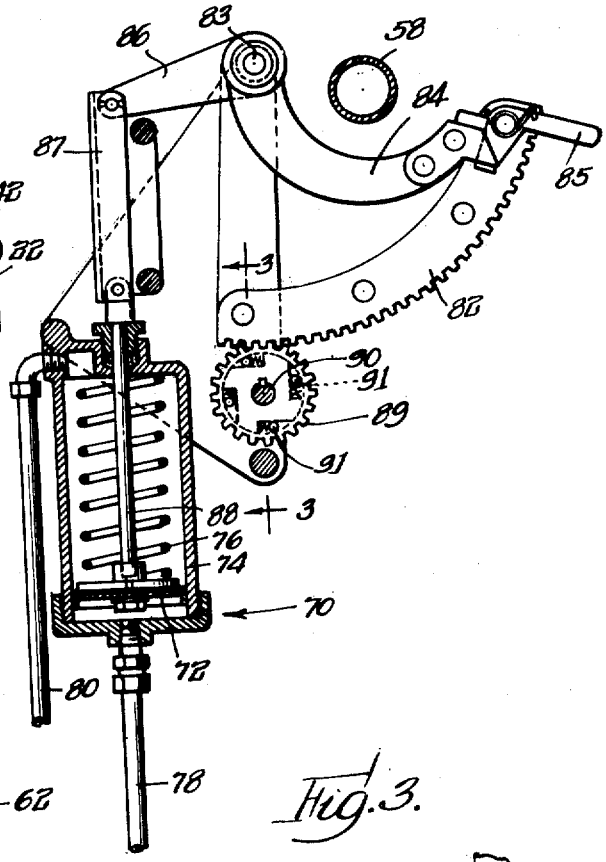
Fig. 2 is a detail view of a part of the register resetting mechanism, employed in the structure of Fig. 1.

As further pointed out in said Foss patent, means is provided in the form of a hydraulic actuator 70, Figs. 1 and 2, for effecting the resetting of the registers 64 and 66 as an incident to the beginning of each dispensing operation. More particularly, a piston 72 is provided within a cylinder 74 normally spring-urged into its lowermost position as shown in Fig. 2 by means of a compression spring 76. The cylinder 74 below the piston communicates by means of a conduit 78 with the pressure chamber 32 of the air separator structure; and above the piston by means of a conduit 80 with the recovery chamber 46.

It will be seen that as pressure is produced within the air separator chamber 32, at the beginning of each dispensing operation, such pressure is transmitted through the conduit 78 so as to raise resetting piston 72 against the action of compression spring 76, whereby to effect the operation of a rack 82 which effects the resetting of the register wheels. More particularly, and as illustrated in Fig. 2, the rack is pivoted upon a shaft 83 and is arranged to be actuated by an arm 84 also pivoted on the shaft and connected to the rack by a latch 85. Arm 84 has an extension 86 pivotally connected to one end of a link 87, the other end of the link being in turn pivotally connected to the rod 88 of the piston 72. At the end of the dispensing operation, as pressure within chamber 32 is reduced to atmospheric pressure by reason of the constantly open escape orifice 44, the reset piston is restored to its lowermost position as shown in Fig. 2 by the action of spring 76, whereby to restore the rack 82 to normal position. The conduit 80 returns any gasoline which escapes past piston 72 to the recovery chamber 46, the conduit 80 also insuring that the uppermost face of the piston 72 will be constantly subjected to atmospheric pressure through said recovery chamber 46 and its connection 48 to atmosphere.

Figure 3:
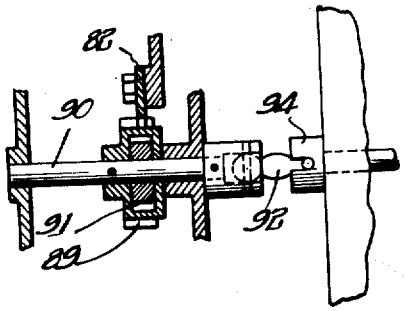
Fig. 3 is an enlarged sectional view of a part of the structure of Fig. 2, on the line 3—3 thereof.

The means for effecting the resetting of the registers 64 and 66 upon operation of rack sector 82 is fully set forth in said Foss patent, and in brief comprises a gear 89 meshing with the rack, said gear being mounted upon a shaft 90 through the intermediary of a series of roller clutches 91. As best shown in Fig. 3, shaft 90 is connected by means of a link 92 to the reset shaft 94 of the register. The release latch 85, Fig. 2, is provided for disconnecting arm 84 from rack 82 at the end of the resetting operation to accommodate the action of certain shutter mechanism characteristic of the type of reset illustrated in said Foss patent.

In accordance with the present invention means is provided for insuring that the delivery valve 36, Fig. 4, will not open until the resetting mechanism shall have had sufficient time to complete its resetting operation. More particularly, it will be seen that the conduit 78 is relatively small, so as to impart only a predetermined speed of operation to the piston 72 in its resetting movement; and in certain instances, were the means of the present invention not provided, it may happen that the delivery valve 36 will open and effect a partial dispensing of gasoline before the resetting of the registers has been completed. This may occur particularly if the nozzle valve associated with the dispensing nozzle 42 is opened immediately as the pump motor 20 is started.

Figure 5:
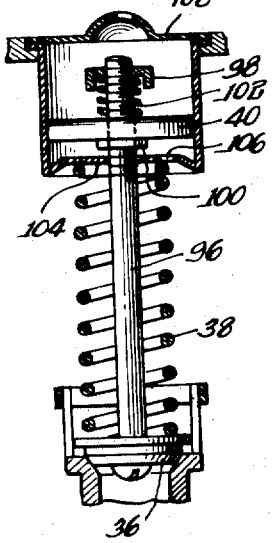
Fig. 5 is an enlarged detail view of the delivery valve forming a part of the structure of Fig. 4.

In accordance with the present invention, and as best shown in Fig. 5, the actuating piston 40 for the delivery valve 36 is slidably mounted on the valve stem 96 for movement between a pair of stop nuts 98 and 100 adjustably mounted upon the threaded upper end portion of the valve stem. A light compression spring 102 normally holds the valve piston downwardly against the lower stop nut 100, as shown. Also, the support member 104 against which the upper end of the compression spring 38 engages, instead of being a lattice or grille, as in the case of the bypass valve 28, in the case of the delivery valve is a solid plate provided with a bleed orifice 106 of predetermined size.

It will be seen that by reason of the construction thus provided, as pressure is built up within the air separator pressure chamber 32, this pressure will project liquid through the conduit 78 to the reset piston, and also through the orifice 106 to effect the actuation of delivery valve piston 40. However, the size of the orifice 106 is so predetermined that the resetting operation shall be completed before the delivery valve piston 40 moves upwardly sufficiently to engage the stop nut 98 and effect the opening of the delivery valve. By this means a predetermined timed delay is provided in the opening of the delivery valve, insuring that the valve will not open, and liquid be inadvertently dispensed, prior to the completion of the register resetting. As will be understood, any liquid which escapes through the dispensing line prior to the completion of the resetting will result in a loss to the pump operator, which in the aggregate may be considerable.

If desired to facilitate the quick closing of the delivery valve, an enlarged opening and associated ball check valve may be provided in plate 104 permitting downward flow therethrough. Such valve is not shown as ordinarily the orifice 106 will permit sufficiently rapid closing of the valve. An apertured plate 108, Fig. 5, permits free communication between the upper side of the piston 40 and the recovery chamber 46, as will be understood.

Figure 6:
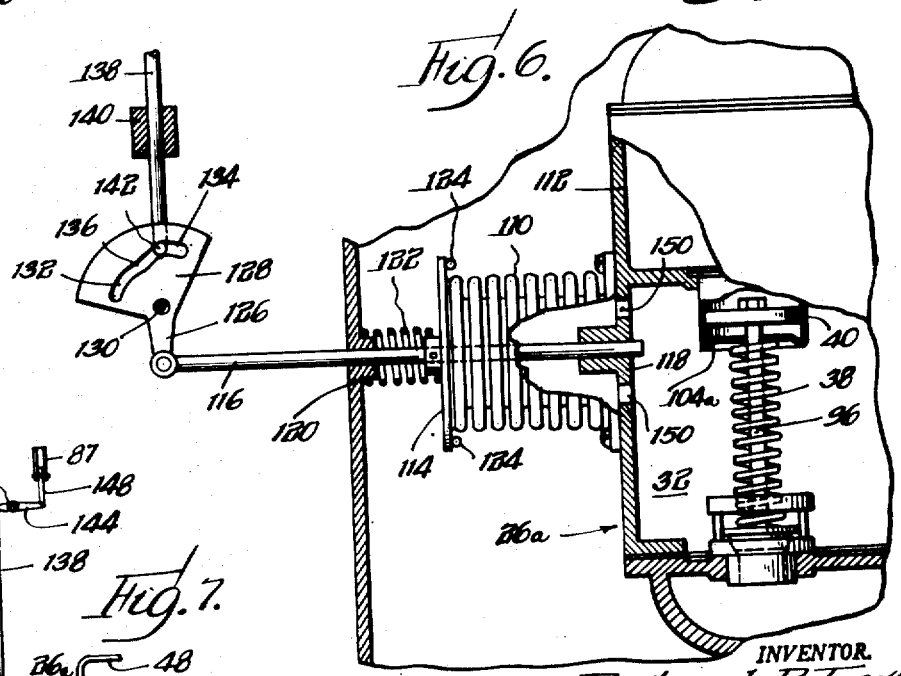
Fig. 6 is a partial view of a modiefid structure for effecting the resetting of the register, by hydraulic actuation, taken as indicated by the line 6—6 of Fig. 7.
Figure 7:
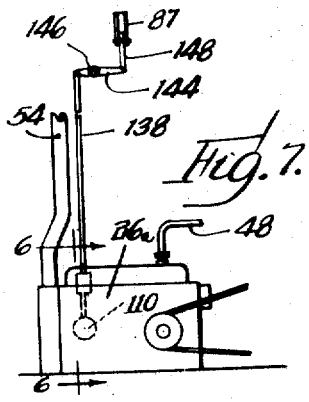
Fig. 7 is an illustrative view showing the mechanism of Fig. 6 and its associated parts.

In Figs. 6 and 7 a modified structural arrangement is illustrated for insuring that the resetting shall be completed before the opening of the delivery valve.

In this instance an air separator 26a is provided, generally similar to the separator 26 previously described, but modified in certain respects. More particularly, in this instance the conduits 78 and 80 are not provided, and a bellows 110, functionally similar to the piston and cylinder device 70, previously described, is secured directly to the rear wall 112 of the air separator structure, in juxtaposition to the delivery valve. Still further, the delivery valve stem 96 may in this instance be rigidly connected to its actuating piston 40, and the support member 104a for the upper end of the delivery valve spring 38 may be an open grille, as in said Foss patent, the control orifice 106, and its function, being unnecessary. The remaining elements of the air separator structure may be as previously described.

Referring further to Fig. 6, it will be seen that the free end of the bellows is secured to an end plate 114 pinned to an operating rod 116. This operating rod is mounted for reciprocation as the bellows expands and contracts, within a bracket 118 formed as a part of the air separator structure, and a fixed frame bracket 120, as shown. A compression spring 122 bears between the frame bracket and the bellows plate 114, normally urging the bellows into its contracted position, as shown in Fig. 6, with the bellows plate in engagement with a pair of stop pins 124.

The rod 116 is pivotally connected to an arm 126 of a sector member 128 suitably pivoted upon the apparatus frame, as indicated at 130. This sector has a cam slot formed therein consisting of an inner portion 132 concentric to the pivot 130, an outer portion 134 also concentric to the pivot, and a rise portion 136 therebetween. An upstanding rod 138 journalled for reciprocation within a frame bracket 140 has its lowermost end 142 turned at right angles so as to project into the cam slot of the sector. As shown in Fig. 7, the upper end of rod 138 is pivotally connected to and arranged to actuate a lever 144, pivotally mounted upon the frame as indicated at 146, and in turn pivotally connected to a rod 148 connected to the lower end of the link 87 previously described.

It will be seen that by reason of the connections provided, as the bellows is expanded, by the introduction of pressure into the pressure chamber 32 of the air separator, the outward movement of rod 116 will actuate the sector and cause downward movement of the rod 138 by reason of its connection with the cam slot. Such downward rod movement produces upward movement of the link 87 to effect the resetting operation of the register, as previously described. The lever 144 effects the necessary magnification of movement, and the cam slot consisting of the concentric portions 132 and 134 and the rise portion 136, provides that the movement of the resetting mechanism may be gradually accelerated from rest, and then gradually again slowed down to a stopped position. By this means a rapid operation of the resetting mechanism may be effected without shock to the parts.

The bellows 110, being in unrestricted communication with the air separator pressure chamber 32 through the relatively large fluid passages as indicated at 150, Fig. 6, will absorb the pressure from the pressure chamber, without danger that the delivery valve may open before the resetting mechanism has completed its operation. More particularly, the combined resistance of the spring 122 and the resiliency of the bellows is less than the resistance of delivery valve spring 38 so that the bellows operates first as pressure builds up within chamber 32, and the unrestricted flow communication between the bellows and the chamber 32 permits the bellows to absorb the pump delivery sufficiently so that the bellows completes its movement before pressure within chamber 32 can build up sufficiently to open the delivery valve. It will of course be understood that the delay mechanism of Fig. 5 can, if desired, be provided for use with the structures of Figs. 6 and 7, but ordinarily is not required.

Figure 8:
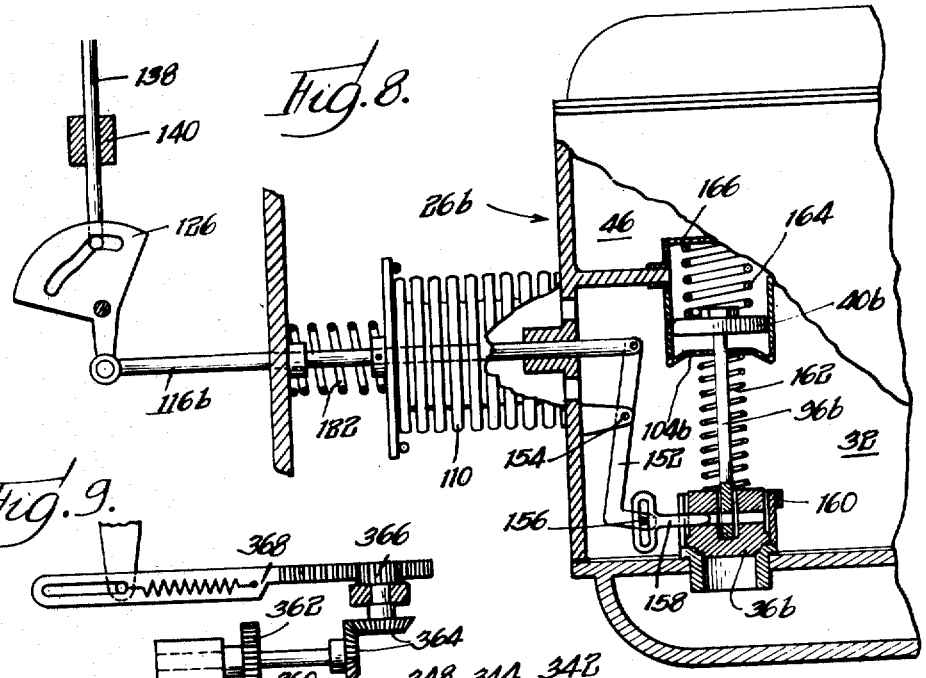
Fig. 8 is a view generally similar to Fig. 6, but illustrating a further modified arrangement.

In Fig. 8 a structural embodiment of the invention is illustrated which is the same as Figs. 6 and 7, except that additional means is provided for precluding the opening of the delivery valve unless and until the resetting mechanism for the register has completed its operation.

As shown, the bellows operating rod 116b is in this instance extended into the pressure chamber 32 of the air separator structure, generally indicated by the reference numeral 26b, for pivotal connection with one end of a lever 152 pivotally mounted upon a bracket in the air eliminator chamber, as indicated at 154. The lower end of this lever has a pin 156 engageable with a vertical slot in a connector pin member 158. This pin member projects through a suitable slot in the delivery valve cage 160 for movement within aligned bores extending through the delivery valve 36b and the delivery valve stem 96b. The operating piston 40b is rigidly fixed to the valve stem. A relatively light compression spring 162 bears between a valve member 36b and the grille 104b, whereas a relatively heavier compression spring 164 bears between the piston 40b and the grille 166 communicating with the recovery chamber 46.

In operation, normally the springs 162 and 164 hold the valve and valve stem in their lowermost or seated positions as shown in Fig. 8. Upon introduction of pressure into the chamber 32, the spring 122 for the reset bellows yields first, as previously described. The leftward movement of the rod 116b causes connector pin 158 to be projected to the right connecting the valve member 36b with its stem 96b so that upon subsequent actuation of the piston 40b, as pressure within chamber 32 increases, the valve stem will effect the lifting of the valve. However, should the valve stem tend to move before completion of the register reset, the pin 158 will be in its unactuated or leftward position as shown in Fig. 8, so that upward movement of the valve stem 96b will not raise the delivery valve, the valve merely being held in seated position by its relatively light spring 162. It will be seen that means is thus provided for precluding the opening of the delivery valve unless and until an adequate movement of the register resetting mechanism has been effected.

In Figs. 11–16 a modified structural embodiment of the invention is illustrated wherein mechanical as distinguished from hydraulic means is provided for effecting the register reset prior to the beginning of the dispensing operation.

A supply pipe 200 having a foot valve 202 leads from an underground gasoline supply tank 204 to a pump structure 206 arranged within the housing 208 of the dispensing apparatus the pump is adapted to be driven by an electric motor 210 by means of drive connections generally indicated by the numeral 212, which will be presently described. A spring pressure relief valve 214 is provided for by-passing the delivery of the pump when the dispensing nozzle is closed, as in the embodiment previously described.

An outlet conduit 216 leads from the pump to an air separator 218 of any suitable construction.

An outlet pipe 220 leads from the air separator to a meter as shown at 222, there being a delivery valve 219 disposed in the pipe which is opened when a predetermined pressure within the air separator has been reached. An outlet pipe 224 leads from the meter through a sight gauge 226 to a flexible hose structure as indicated at 228 and a nozzle structure 230 having the usual manually operated nozzle control valve.

The meter is arranged to drive a volume register 232 and a cost register 234, the drive to the cost register passing through a price variator as indicated at 236, as in the previously described structure.

The energization of the motor is controlled by a switch 238, actuated from the nozzle support lever 240, in the usual manner.

The drive connections between the pump and the motor, and the means incorporated therein for effecting the resetting of the registers as an incident to the beginning of a dispensing operation, are best illustrated in Fig. 12. As shown, the drive connections between the pump and motor comprise a shaft 242 geared to the motor and a shaft 244 geared to the pump. Shaft 242 is provided with an extension 246 projecting into a receiving opening in the shaft 244, the arrangement being such that the shafts are maintained in axial alignment, but are permitted to rotate a predetermined amount relative to each other and also to rotate together as a unit within their associated bearing structures 248 and 250.

The means for predetermining the relative rotation between the shafts comprises a torsion spring 252 one end of which is connected to the shaft 242 and the other end of which is connected to the shaft 244.

A collar 254 is arranged for slidable movement along the outer surface of the shaft 244, the collar being provided with a pin 256 projecting through a slot 258 formed longitudinally in shaft 244 and into engagement with the helical screw thread 260 formed on the surface of the extension 246 of shaft 242.

It will be seen that by reason of the construction provided, as the motor 210 is energized at the beginning of the dispensing operation, a predetermined relative rotation takes place between shafts 242 and 244 before they begin rotation as a unit to drive the pump, the amount of the relative rotation being determined by the spring 252 as it absorbs the driving torque. This relative rotation of the shafts projects the collar 254 longitudinally, to the left as seen in Fig. 12, a predetermined distance.

A yoke 262, suitably pivoted to the frame as indicated at 264, is connected to the collar 254 through an antifriction bearing 266. The yoke is also connected to a link 268 having a pin and slot connection with a cam slot sector member 270 functionally similar to the sector 128 previously described. The sector has a pair of concentric slot portions 272 and 274 connected by an intermediate rise portion, as previously described. An upstanding rod 276 is arranged for operation by the cam slot, as in the case of the previously described rod 138.

It will be seen that as the collar 254 is projected to the left, as seen in Fig. 12, rod 276 will be raised. This rod movement may be employed to effect the resetting of any selected register structure, for example, as in the Foss patent previously referred to. In Figs. 13–16 one suitable and preferred form of register is set forth, and will now be described.

As shown in Figs. 12 and 13, the upper end of rod 276 is bifurcated and arranged to operate a pair of pivoted sectors 278 and 280. Sector 278 is provided with a toothed portion 282 and a non-toothed portion 284 cooperable with a gear 286 secured to one end of a common notched reset shaft 288 upon which the wheels of both the volume register 232 and the cost register 234 are mounted.

As best shown in Figs. 15 and 16, shaft 288 is provided with a reset notch running along its length cooperable with a series of spring-pressed pawls 290 carried by each of the register wheels 291 in such a manner that as the shaft is rotated in a counterclockwise direction as seen in Fig. 15, the register wheels will be picked up and restored counterclockwise to zero position, or in the same direction in which the register wheels are driven by the drive connections 292 and 293 from the meter. The toothed portion 282 of sector 278 is of sufficient length so that slightly in excess of one revolution is imparted to the reset shaft 288, upon each operation of the sector. The positioning of the pawls 290 upon the register wheels is such that the wheels will be moved to zero position as the shaft 288 completes its resetting movement.

The lowest order register wheel has frictionally mounted thereon a drive gear 294 in geared engagement with the meter drive connections, whereas the higher order register wheels similarly are provided with drive gears 294 frictionally mounted thereon, and adapted to be driven by Geneva gears 295 of a standard Geneva transfer mechanism. As will be understood, the Geneva gears 295 are cooperable with and driven from Geneva cams 296 formed as a part of each of the register wheels.

To prevent overthrow of the register wheels, as they are reset to zero position, each wheel is provided with a cam 298 from which laterally projects a pin 300 cooperable with a stop or overthrow preventing pawl 302, the latter pawls being fixed to a shaft 304 extending longitudinally of the register mechanism. The end of this shaft carries a pawl 306 cooperable with a cam 308 arranged for operation by suitable gearing as indicated at 310 connected to the sector 280. The cam sector 308 is provided with a notched or recessed portion 312 at a predetermined point thereon, the arrangement being such that as the register wheels reach zero position in their resetting movement, the pawl 306 drops into the recess 312 under the urging action of a spring 314, whereby to move the stop pawls 302 counterclockwise as seen in Fig. 15 into position to be engaged by the numeral wheel pins 300. Continued movement of the cam 308 moves the pawl 306 away from the recess 312 and onto the higher cam surface 310 to again withdraw the stop pawls 302 from blocking position. During this latter movement of the cam 308 the non-toothed portion 284 of sector 278 is in operative juxtaposition to the gear 286 so that the reset shaft 288 is not operated.

As will be understood, the foregoing resetting movements are imparted to the register each time the drive motor 210 of the apparatus is energized, to begin a dispensing operation. At the end of the dispensing operation, as the spring 252 is restored to normal relaxed position, rod 276 is restored downwardly, returning the resetting mechanism to normal position. A series of pawl detents 318, Figs. 13 and 15, are urged individually into engagement with the register wheel cams 298 by means of springs 320, so as to aid in properly aligning the register wheels with the sight windows 322 provided in the casing structure.

Due to the insured and rapid operation of the register wheels upon resetting, shutter mechanisms ordinarily required in the case of forward resetting are not necessary. Furthermore, while the resetting operations are rapid, the shaping of the cam slot in the sector 270, and the overthrow preventing devices 300—302 insure a smooth resetting movement of the register wheels, without danger of overthrow.

Referring further to Fig. 12, if desired, the sector 270 may be provided with a series of ratchet teeth 324 cooperable with a controlled pawl 326 normally urged by a spring 328 away from the sector but adapted to be projected by a solenoid 330 against the action of the spring into engagement with the sector surface. The solenoid 330 may, for example, be arranged in series in the energizing circuit for the motor. By this means return movement of the sector 270 is prevented, until the motor is deenergized, regardless of variations in the loading of the pump 206 which might produce slight variations in the positioning between the shafts 242 and 244 during a dispensing operation. Ordinarily such variations are slight and are compensated for by the concentric portion 272 of the cam slot in sector 270, so that slight movements of the sector 270 produce no corresponding movement of the rod 276. Use of the pawl 326 is accordingly optional in this, or in other forms of the invention. A safety spring 332 cooperates with the pawl 326 to permit a restoring movement of the collar 254 in the event, for one reason or another, that the sector 270 might be held by the pawl 326 from its corresponding restoring motion.

By predetermining the strength of the spring 252, it is insured that the resetting will be completed before any fluid dispensing movement of the pump, and the building up of sufficient pressure to open the delivery valve 219.

Figure 9:
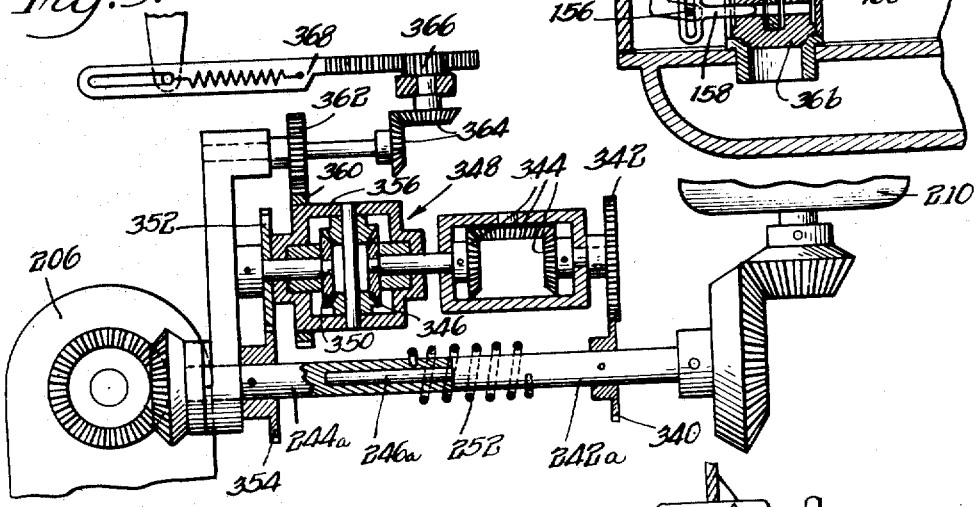
Figs. 9 and 10 are illustrative views indicating the principles of the invention as applied to mechanical and electrical resetting arrangements, respectively.

In Fig. 9 a modified mechanical drive arrangement for effecting movement of the resetting mechanism is shown. In this instance the motor 210 and the pump 206 are interconnected as before by means of shafts 242a and 244a, and the interconnected drive spring 252. However, in this instance the shaft extension 246a is nonthreaded, and a different means is employed responsive to relative motion between the shafts 242a and 244a to effect operation of the resetting mechanism.

More particularly, as shown in Fig. 9, a gear 340 is secured to shaft 242a, which gear, through the intermediary of a gear 342, and a reversing bevel gearing 344 is arranged to drive one side gear 346 of a differential gearing generally indicated by the numeral 348. The other side gear 350 of the differential is arranged to be driven from the shaft 224a through the intermediary of gears 352 and 354. The cage 356 of the differential mechanism is provided with a gear 360 which by means of a gear 362 and gearing 364 is arranged to drive a gear 366 meshing with a rack 368 functionally similar to the link 268 previously described in reference to Fig. 12.

It will be seen that any relative movement between shafts 242a and 244a will produce a corresponding movement of differential gear 360 and the rack 368. This movement, which occurs at the beginning and end of each dispensing operation, as previously described, is employed to effect the register reset.

Figure 10:
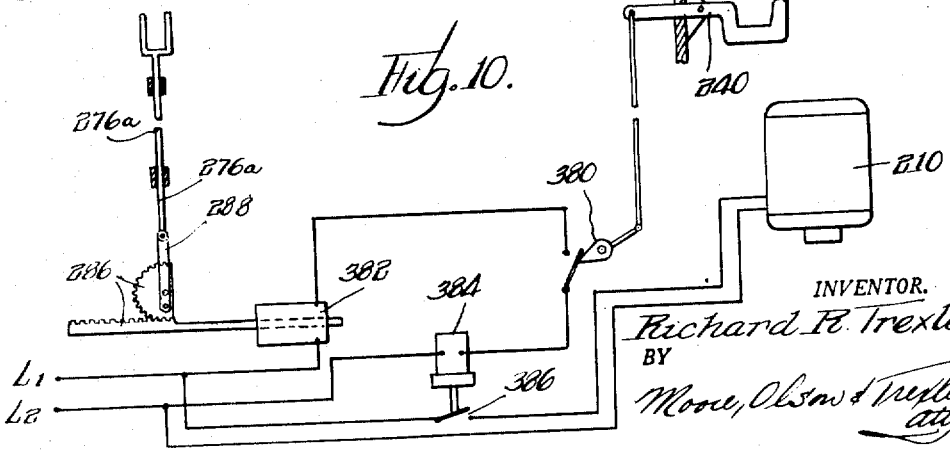

In Fig. 10 an arrangement is disclosed for electrically effecting the resetting of the register as an incident to the beginning of each dispensing operation.

Referring to Fig. 10, a switch 380 is adapted to be closed upon the lifting of the hose nozzle 240, the switch being arranged when closed to effect the simultaneous energization of a solenoid 382 and a solenoid 384 in a control circuit leading from the power lines $L_1$ and $L_2$. Solenoid 382 is rapid acting and operates immediately as the solenoid is energized through a rack and sector 288, and link 288, to raise rod 276a and effect the register reset, as previously described. Solenoid 384 is slow acting, and after a predetermined timed delay, sufficient to permit the completion of the register reset, its energization effects the closing of a switch 386 whereby to close a power circuit from the lines $L_1L_2$ to the drive motor 210.

It is obvious that various changes may be made in the specific embodiments set forth without departing from the spirit of the invention. The invention is accordingly not to be limited to the precise embodiments shown and described, but only as indicated in the following claims.

The invention is hereby claimed as follows:

[1. A liquid dispensing apparatus comprising a dispensing line adapted to be connected to a source of liquid supply, means for establishing pressure on liquid in said line, means for controlling the flow of liquid through the dispensing line, register mechanism operable in accordance with the flow of liquid through the dispensing line, resetting means for the register mechanism, and common control means for effecting the operation of the register resetting means and the liquid control means in response to actuation of said pressure establishing means, said common control means including mechanism for effecting the operation of the flow control means in predetermined timed relation to the completion of the operation of the register resetting means.]

[2. A liquid dispensing apparatus comprising a dispensing line adapted to be connected to a source of liquid supply, means for establishing pressure on liquid in said line, means for controlling the flow of liquid through the dispensing line, register mechanism operable in accordance with the flow of liquid through the dispensing line, resetting means for the register mechanism, and common control means for effecting the operation of the register resetting means and the liquid flow control means in response to actuation of said pressure establishing means, said common control means including mechanism for initiating the effective operation of flow control means a predetermined time after the completion of the operation of the register resetting means.]

3. A liquid dispensing apparatus comprising a dispensing line adapted to be connected to a source of liquid supply, means for controlling the flow of liquid through the dispensing line, register mechanism operable in accordance with the flow of liquid through the dispensing line, positive resetting means for the register mechanism, [and] common control means for effecting the operation of the register resetting means and the liquid flow control means, said common control means including mechanism for simultaneously moving the flow control means and the register resetting means[,] and for delaying the effective operation of the flow control means until after the completion of the effective operation of the register resetting means, *and means to adjust the time interval between completion of resetting and effective operation of the flow control means.*

[4. A liquid dispensing apparatus comprising a dispensing line adapted to be connected to a source of liquid supply, means for controlling the flow of liquid through the dispensing line, register mechanism operable in accordance with the flow of liquid through the dispensing line, positive resetting means for the register mechanism, and common control means for effecting the operation of the register resetting means and the liquid flow control means, said common control means including hydraulic mechanism for initiating the effective operation of the flow control means a predetermined time after the completion of the operation of the register resetting means.]

[5. A liquid dispensing apparatus comprising a dispensing line adapted to be connected to a source of liquid supply, means including a delivery valve for controlling the flow of liquid through the dispensing line, register mechanism operable in accordance with the flow of liquid through the dispensing line, positive resetting means for the register mechanism, and common control means for effecting the operation of the register resetting means and said delivery valve, said common control means including mechanism for effecting the opening of the delivery valve a predetermined time after the completion of the operation of the register.]

[6. A liquid dispensing apparatus comprising a dispensing line adapted to be connected to a source of liquid supply, means including a delivery valve for controlling the flow of liquid through the dispensing line, register mechanism operable in accordance with the flow of liquid through the dispensing line, resetting means for the register mechanism, and common control means for effecting the operation of the register resetting means and said delivery valve, said common control means including a lost motion connection and a fluid control orifice for effecting the opening of the delivery valve a predetermined time after the completion of the operation of the register resetting means.]

[7. A liquid dispensing apparatus comprising a dispensing line adapted to be connected to a source of liquid supply, means for establishing pressure on liquid in said line, means for controlling the flow of liquid through the dispensing line, resetting means for the register mechanism, and common control means for effecting the operation of the register resetting means and the liquid flow control means, said common control means including hydraulic mechanism responsive to pressure established in the least part of said line for effecting the operation of the flow control means a predetermined time interval after completion of the operation of the register resetting means.]

8. A liquid dispensing apparatus comprising a dispensing line adapted to be connected to a source of liquid supply, means for establishing pressure on liquid in said line, means including a hydraulic actuator for controlling the flow of liquid through the dispensing line, register mechanism operable in accordance with the flow of liquid through the dispensing line, resetting means including a hydraulic actuator for resetting the register mechanism in response to pressure established in at least a part of said line, and common control means for effecting the operation of said hydraulic actuators, said hydraulic actuators being operable at different pressures, and means substantially independent of a pressure drop from said line to said resetting actuator for insuring a predetermined timed delay between operation of said actuators.

9. A liquid dispensing apparatus comprising a dispensing line adapted to be connected to a source of liquid supply, means including a higher pressure hydraulic actuator for controlling the flow of liquid through the dispensing line, register mechanism operable in accordance with the flow of liquid through the dispensing line, resetting means including a lower pressure hydraulic actuator for resetting the register mechanism, and common control means including a source of liquid pressure for effecting the operation of said hydraulic actuators, said hydraulic actuators being operable at different pressures, and the lower pressure hydraulic actuator being in juxtaposition to said pressure source providing unrestricted connections between the lower pressure actuator and the pressure source so as to preclude the building up of pressure due to such connections during the operation of said lower pressure actuator.

10. A liquid dispensing apparatus comprising a dispensing line adapted to be connected to a source of liquid supply, means for controlling the flow of liquid through the dispensing line, register mechanism operable in accordance with the flow of liquid through the dispensing line, resetting means for the register mechanism, and power connections for effecting the operation of the register resetting means and the liquid flow control means in predetermined timed relation, said connections including means for moving the register during resetting at a progressively increasing rate of speed until a maximum speed of operation has been reached and thereafter at a progressively decreasing rate of speed.

11. A liquid dispensing apparatus comprising a dispensing line adapted to be connected to a source of liquid supply, means for establishing pressure on liquid in said line, means for controlling the flow of liquid through the dispensing line, register mechanism operable in accordance with the flow of liquid through the dispensing line, resetting means for the register mechanism, and common control means for effecting the operation of the register resetting means and the liquid flow control means in response to actuation of said pressure establishing means, said control means including a latching mechanism controlled by the action of the resetting means for precluding effective operation of the flow control means until after the completion of the operation of the register resetting means.

12. A liquid dispensing apparatus comprising a dispensing line adapted to be connected to a source of liquid supply, means for establishing pressure on liquid in said line, means including a delivery valve for controlling the flow of liquid through the dispensing line, register mechanism operable in accordance with the flow of liquid through the dispensing line, resetting means for the register mechanism, and common control means for effecting the operation of the register resetting means and said delivery valve in response to actuation of said pressure establishing means, said control means including a latching structure controlled by the action of the resetting means for preventing operation of the delivery valve until the completion of the operation of the register resetting means.

[13. A liquid dispensing apparatus comprising a dispensing line adapted to be connected to a source of liquid supply, means for controlling the flow of liquid through the dispensing line including a pump, a motor for driving the pump, drive connections between the motor and the pump, register mechanism operable in accordance with the flow of liquid through the dispensing line, positive resetting means for the register mechanism, and common control means powered by said drive connections for effecting the operation of the register resetting means and the liquid flow control means in predetermined timed relation.]

[14. A liquid dispensing apparatus comprising a dispensing line adapted to be connected to a source of liquid supply, means for controlling the flow of liquid through the dispensing line including a pump, a motor for driving the pump, yieldable drive connections between the motor and the pump, register mechanism operable in accordance with the flow of liquid through the dispensing line, positive resetting means for the register mechanism, and common control means powered by said drive connection for effecting the operation of the flow control means a predetermined time after the operation of the register resetting means.]

[15. A liquid dispensing apparatus as defined in claim 14, wherein said yieldable drive connections include a shaft connected to the pump, a shaft connected to the motor, and a yieldable drive spring interconnecting said shafts.]

[16. A liquid dispensing apparatus comprising a dispensing line adapted to be connected to a source of liquid supply, means for controlling the flow of liquid through the dispensing line, register mechanism operable in accordance with the flow of liquid through the dispensing line, resetting means for the register mechanism, and common control means for effecting the operation of the register resetting means and the liquid flow control means, said common control means including an electric circuit for energizing the register resetting means, an electric circuit for energizing the flow control means, and means interconnecting with both said circuits controlling the operation thereof to energize the register resetting means and the flow control means in predetermined sequential relation.]

17. A liquid dispensing apparatus comprising a dispensing line adapted to be connected to a source of liquid supply, means for establishing pressure on liquid in said line, means for controlling the flow of liquid through the dispensing line, register mechanism operable in accordance with the flow of liquid through the dispensing line, resetting means for the register mechanism, and common control means for effecting the operation of the register resetting means and the liquid flow control means in response to actuation of said pressure establishing means, said common control means including a slow operating solenoid for effecting the operation of the flow control means a predetermined time after the operation of the register resetting means.

18. A liquid dispensing apparatus comprising a dispensing line adapted to be connected to a source of liquid supply, means for controlling the flow of liquid through the dispensing line, register mechanism operable in accordance with the flow of liquid through the dispensing line, resetting means for the register mechanism, and power means for effecting the operation of the register resetting means and the liquid flow control means in predetermined timed relation, said register resetting means comprising a power operated actuating member, a zero stop for the register, means controlled by the actuating member for moving the zero stop into effective position upon a predetermined movement of the actuating member in a given direction, and means also controlled by the actuating member for withdrawing the zero stop upon a further movement of the actuating member in the same direction.

19. A liquid dispensing apparatus comprising a dispensing line adapted to be connected to a source of liquid supply, means for controlling the flow of fluid through the dispensing line, register mechanism operable in accordance with the flow of liquid through the dispensing line, resetting means for the register mechanism, and power means for effecting the operation of the register resetting means and the energizing and deenergizing of the liquid flow control means in predetermined relation, said power means including a member engageable with the register wheels to effect the forward resetting thereof as the liquid flow control means is energized, said member being restored to original position upon the deenergization of the liquid flow control means.

20. A liquid dispensing apparatus comprising a dispensing line adapted to be connected to a source of liquid supply, and means for controlling the flow of liquid through the dispensing line, said means comprising a delivery valve, a piston for operating the delivery valve, a detachable connection between said piston[s] and said valve connected after a first predetermined timed delay, a lost motion connection between the delivery valve and piston whereby to effect a second predetermined timed delay in the operation of the valve after the actuation of the piston.

*21. A liquid dispensing apparatus comprising a dispensing line adapted to be connected to a source of liquid supply, means for establishing pressure on liquid in said line, an air separator in said line, a control valve in said air separator, said control valve in the closed position blocking said dispensing line and preventing dispensing of liquid therethrough, a register mechanism operable in accordance with the flow of liquid through the dispensing line, resetting means for the register mechanism, and control means for effecting the operation of the register resetting means in response to actuation of said pressure establishing means and thereafter opening said control valve after completion of the operation of the register resetting means whereby positively to insure that all liquid passing through said dispensing line in each dispensing operation is registered on said register mechanism.*

*22. A liquid dispensing apparatus comprising a dispensing line adapted to be connected to a source of liquid supply, a pump for forcing liquid through the dispensing line, an air separator in said line, a control valve in said air separator, said control valve in the closed position blocking said dispensing line and preventing dispensing of liquid therethrough, a register mechanism operable in accordance with the flow of liquid through the dispensing line, resetting means for the register mechanism, and control means for effecting the operation of the register resetting means in response to actuation of said pump and thereafter opening said control valve a predetermined time interval after completion of the operation of the register resetting means.*

*23. A liquid dispensing apparatus comprising a dispensing line adapted to be connected to a source of liquid supply, a pump for forcing liquid through the dispensing line, an air separator in*

*said line, a control valve in said air separator, said control valve in the closed position blocking said dispensing line and preventing dispensing of liquid therethrough, a register mechanism operable in accordance with the flow of liquid through the dispensing line, resetting means for the register mechanism, control means for effecting the operation of the register resetting means in response to actuation of said pump and thereafter opening said control valve a predetermined time interval after completion of the operation of the register resetting means, and means to adjust the time interval between completion of resetting and opening of said control valve.*

*24. A liquid dispensing apparatus comprising a dispensing line adapted to be connected to a source of liquid supply, means for establishing pressure on liquid in said line, a control valve for controlling the flow of liquid through the dispensing line, register mechanism operable in accordance with the flow of liquid through the dispensing line, resetting means for the register mechanism, and electrical control means to operate said register resetting means and thereafter upon completion of the resetting operation to open said control valve whereby to insure that all liquid passing through said dispensing line in each dispensing operation is registered on said register mechanism.*

*25. A liquid dispensing apparatus comprising a dispensing line adapted to be connected to a source of liquid supply, means for establishing pressure on liquid in said line, a control valve for controlling the flow of liquid through the dispensing line, register mechanism operable in accordance with the flow of liquid through the dipensing line, resetting means for the register mechanism, and electrical control means to operate said register resetting means and at the end of a predetermined time interval after completion of the resetting operation to open said control valve.*

*26. A liquid dispensing apparatus comprising a dispensing line adapted to be connected to a source of liquid supply, means for establishing pressure on liquid in said line, a control valve for controlling the flow of liquid through the dispensing line, register mechanism operable in accordance with the flow of liquid through the dispensing line, electrical resetting means for the register mechanism, and electrical control means responsive to actuation of said pressure establishing means to operate said electrical register resetting means and thereafter upon completion of the resetting operation to open said control valve.*

*27. A liquid dispensing apparatus comprising a dispensing line adapted to be connected to a source of liquid supply, means for controlling the flow of liquid through the dispensing line including a pump, a motor for driving the pump, a shaft connected to said pump, a shaft connected to said motor, a yieldable drive spring interconnecting said pump shaft and said motor shaft, register mechanism operable in accordance with the flow of liquid through the dispensing line, positive resetting means for the register mechanism, and common control means powered by said drive connection for effecting the operation of the flow control means at a predetermined time after the operation of the register resetting means.*

References Cited in the file of this patent or the original patent

UNITED STATES PATENTS

| Number | Name | Date |
|---|---|---|
| 1,999,697 | Kleckner et al. | Apr. 30, 1935 |
| 2,028,102 | Goss et al. | Jan. 14, 1936 |
| 2,074,292 | Wilkins | Mar. 16, 1937 |
| 2,084,288 | Holley et al. | June 14, 1937 |
| 2,109,352 | Hazard | Feb. 22, 1938 |
| 2,173,477 | Goss | Sept. 19, 1939 |
| 2,265,514 | Carroll | Dec. 9, 1941 |
| 2,267,793 | Hazard | Dec. 30, 1941 |
| 2,289,003 | Foss | July 7, 1942 |